April 18, 1967 C. L. HAINES 3,314,656
VEHICLE JACK
Filed April 23, 1965 2 Sheets-Sheet 1

INVENTOR.
CLIFFORD L. HAINES
BY
*M. A. Hobbs*
ATTORNEY

April 18, 1967  C. L. HAINES  3,314,656
VEHICLE JACK

Filed April 23, 1965  2 Sheets-Sheet 2

INVENTOR.
CLIFFORD L. HAINES
BY M. A. Hobbs
ATTORNEY

United States Patent Office 3,314,656
Patented Apr. 18, 1967

3,314,656
VEHICLE JACK
Clifford L. Haines, P.O. Box 3, Bristol, Ind. 46507
Filed Apr. 23, 1965, Ser. No. 450,429
9 Claims. (Cl. 254—103)

The present invention relates to jacks and more particularly to electrically powered jacks for vehicles.

While power jacks operated either by hydraulic or electrical mechanisms have been extensively used in connection with service stations, garages and other similar places where a source of power independent from the vehicle is available, jacks for use with the vehicle and by the vehicle operator under various conditions have not generally been satisfactory for a number of reasons. The prior jacks of this type were too large and heavy to handle, difficult to control during the vehicle raising and lowering operation, and have required both hands in order to hold the jack in place while it was being operated and to operate the controls for raising and lowering the vehicle, thus making the operation difficult and often dangerous for the operator. Further, in the prior electric jacks, a speed reducer has normally been employed which is relatively heavy and expensive, or unreliable and easily damaged, or has required a large motor requiring more current than is available from the electrical system of the vehicle. It is therefore one of the principal objects of the present invention to provide an easily portable power jack for an automobile, truck or similar vehicle which can be operated directly from the electrical system of the vehicle and which is so constructed and designed that it can be conveniently carried in the vehicle, easily lifted into and removed from the vehicle, and readily placed in position beneath or adjacent the vehicle when the vehicle lifting operation is to be performed.

Another object of the invention is to provide an electric jack which can be separated into two easily handled and stored parts for carrying in the vehicle and which can easily be removed from the vehicle and readily assembled in the place where it is to be used.

Often the vehicle must be raised and lowered along the side of the highway where ground is sloping or rough and where the operator may have difficulty in finding a firm footing for himself and the jack. Further, because of the vehicle position, condition of the ground on which the vehicle is resting or the physical condition of the operator, the operator may have difficulty in kneeling, squatting or bending over to place the jack in position for lifting the vehicle or for operating the jack controls to raise and lower the vehicle. It is therefore another object of the invention to provide a power jack which will adapt itself effectively to sloping and uneven ground and which can be easily placed in position for lifting the vehicle, and thereafter held in place and operated to raise and lower the vehicle with the operator standing in an erect or nearly erect position.

Still another object of the invention is to provide a relatively simple electric jack mechanism which can be easily fabricated and assembled with the use of few precision parts and which will give long, trouble-free service.

A further object is to provide a power jack of the aforesaid type which is so constructed and designed that it can be effectively and conveniently placed and held in position and easily controlled with one hand performing both the holding and controlling operations, and the two separate parts of which can be connected for operation by merely inserting one part in the other, and disconnected by merely releasing a single latch or lever and lifting one part from the other.

Additional objects and advantages of the present invention will become apparent from the following description and accompanying drawings, wherein.

Figure 1:
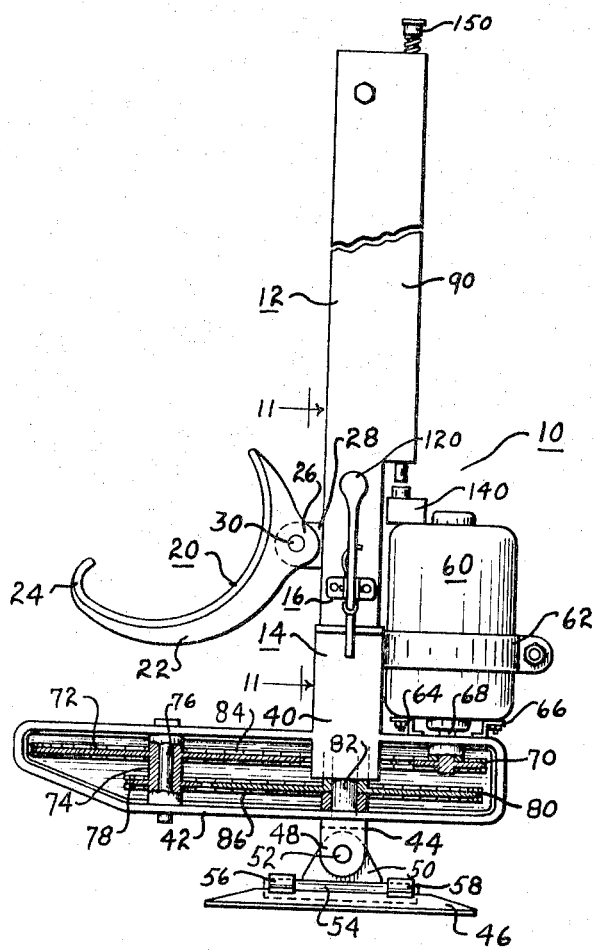
FIGURE 1 is a front elevational view of the present jack with a portion of the cover of the drive mechanism broken away.
Figure 2:
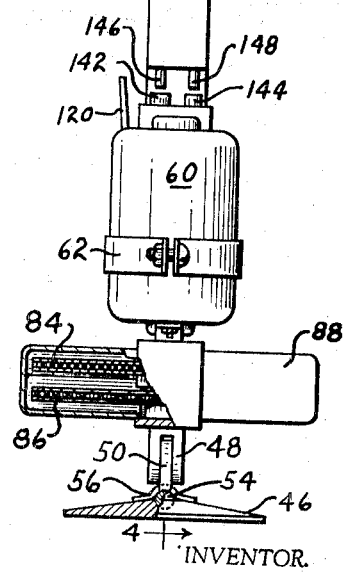
FIGURE 2 is a side elevational view of the jack shown in FIGURE 1 with a portion of the cover for the drive mechanism broken away.
Figure 4:
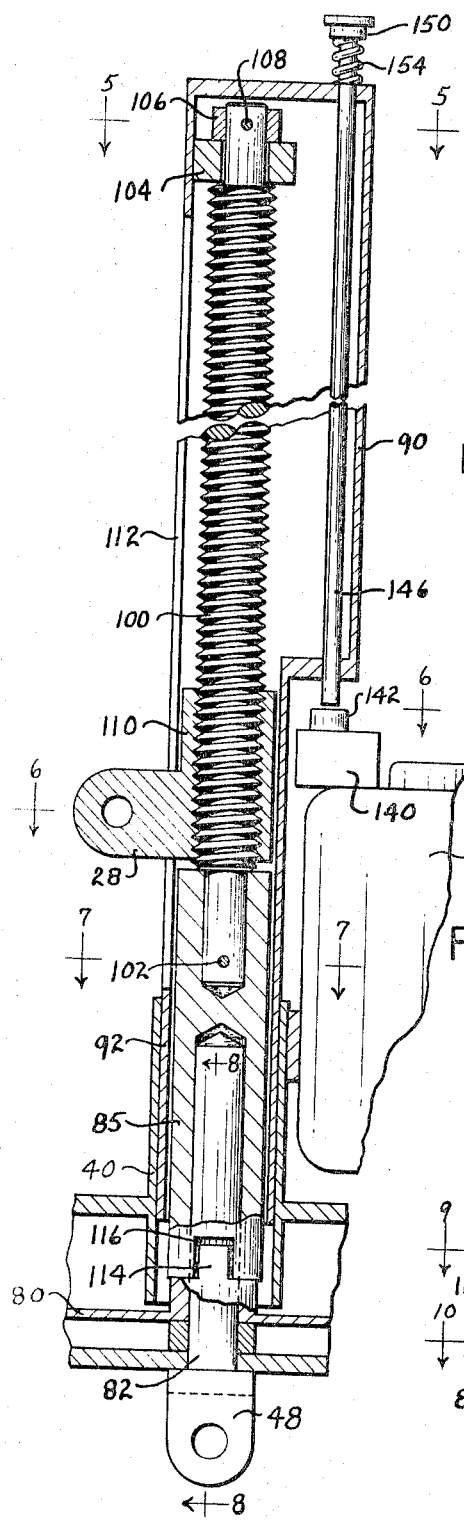
FIGURE 4 is a vertical cross sectional view of the jack shown in the preceding figures, the section being taken on line 4—4 of FIGURE 2.
Figure 5:
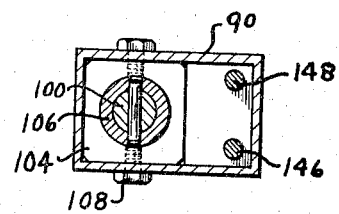
FIGURE 5 is a horizontal cross sectional view taken on line 5—5 of FIGURE 4.
Figure 6:
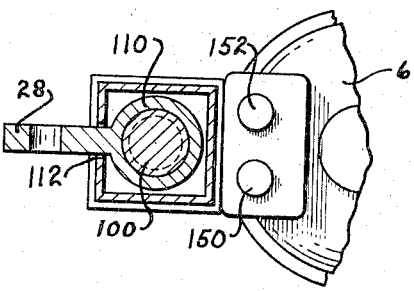
FIGURE 6 is a fragmentary horizontal cross sectional view taken on line 6—6 of FIGURE 4.
Figure 7:
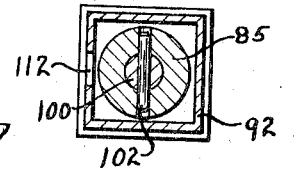
FIGURE 7 is a further fragmentary cross sectional view taken on line 7—7 of FIGURE 4.
Figure 8:
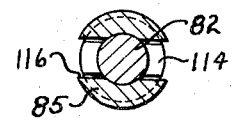
FIGURE 8 is a fragmentary vertical cross sectional view taken on line 8—8 of FIGURE 4.
Figure 9:
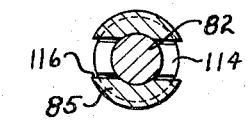
FIGURE 9 is a horizontal cross sectional view of the part shown in FIGURE 8, the section being taken on line 9—9 of the latter figure.
Figure 10:
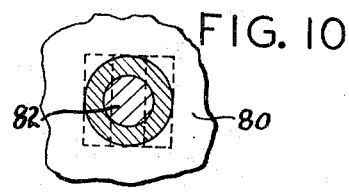
FIGURE 10 is a horizontal cross sectional view taken on line 10—10 of FIGURE 8.

Referring more specifically to the drawings and to FIGURE 1 in particular, numeral 10 designates the jack generally, 12 the upper part, and 14 the lower part or base, the two parts being separable from one another and connected in operating position by a latch mechanism 16 mounted on the upper part and engaging the lower part when the two parts are connected in operative position. The two parts may be readily separated so that the two parts can be easily handled and stored in a vehicle and reassembled when a jack is required for lifting the vehicle. The type of jack shown in the drawings is intended for use in connection with an automobile having readily accessible front and rear bumpers, and the fixture for connecting the jack to the bumper is shown at numeral 20, and consists of an arcuate hook-like body 22 with a hook 24 on the lower end, and an eye 26 on the rear side connected to part 12 by a lug 28 and a pin 30, the latter extending through the eye and lug. Various other types of fixture 20 may be used, depending upon the particular vehicle and bumper construction. If no bumper is available for use with the jack, a different type of fixture such as a straight outwardly projecting arm may be used, the fixtures being designed and adapted for the various types of vehicles and bumper construction.

The lower part or base 14 of the jack consists of a body 40 having a frame 42 mounted on the lower end thereof, and a post 44 extending downwardly from the frame and pivotally connected to a foot 46 by a bifurcated boss 48 and boss 50 having holes therethrough, and a pin 52 connecting the two bosses to one another. This interlocking boss arrangement permits the jack to tilt to either side as viewed in FIGURE 1. In order to permit the jack to adjust itself in the opposite direction, boss 50 is connected directly to a rotatable pin 54, which in turn is held in place on foot 46 by a pair of metal strap-like members 56 and 58, which are looped over pin 54 and joined at their two ends at foot 46 by welding or any other suitable securing means. Mounted on frame 42 is a motor 60 secured to body 40 by a fixture 62 and to the frame by fixtures 64 and 66. The shaft 68 of the motor extends downwardly through the frame and operates a speed reducing mechanism consisting of a small sprocket 70 mounted on the lower end of motor shaft 68, and a large sprocket 72 mounted on a hub 74, which in turn is rotatably mounted on a shaft 76 supported at its upper and lower ends on the upper and lower frame members of frame 42. A small sprocket 78 is also mounted on hub 74 and rotates with the hub and with sprocket 72. A large sprocket 80 is mounted on a shaft 82 of the jack column 85 for rotation thereon, and is driven by the motor through sprocket 70, chain 84 on sprockets 70 and 72, and chain 86 on sprockets 78 and 80. The speed reducer drive mechanism just described is preferably enclosed in a housing 88 to protect it from dirt and to protect the operator from the operating mechanism.

The upper part 12 of the jack consists of a housing 90 having a lower square portion 92 which extends downwardly into a square opening in body 40 of the lower part and is held rigidly in vertical position by body 40. The housing contains a screw 100 connected at its lower end to column 85 by a pin 102 extending through the column and the lower end of the screw so that the column and screw rotate in unison. The upper end of the screw is journalled in a fixture 104 secured to the inside of housing 90, and the screw is held in place in the housing by collar 106 and on the upper end of the screw by a bolt or pin 108 extending through the collar and the pin. The screw rotates freely with respect to the housing and column 85 rotates freely with respect to body 40 while the column and screw are being driven by the speed reducing drive mechanism previously described. A nut 110 is threadedly mounted on the screw and is adapted to move upwardly and downwardly as the screw is rotated, the nut being prevented from rotating by lug 28 projecting through vertical slot 112 extending substantially the full length of the threaded portion of the screw. Column 85 is removably connected to sprocket 80 by interlocking lug 114 of the sprocket and slot 116 in the lower end of the column and is readily separated from the interlocking lug and slot when part 12 is lifted from body 40.

The two parts 12 and 14 are retained together by latch 16 consisting of a lever 120 pivotally connected to housing 90 by a lug 122 and pin 124 extending through the lug and lever. The lower end of lever 120 is provided with a shoulder or hook 126 which slips beneath and engages a lug 128 on the upper end of body 40 and is provided with an angular end portion 130 which permits the lever to automatically engage and lock itself into place when upper part 12 is seated in lower part 14. A spring 132 urges the shoulder or hook inwardly so that it will snap beneath the lower side of lug 128 when the two parts are pushed together.

The motor, which is of the reversible type, is controlled by a switch in housing 140 mounted on the upper end of the motor, the switch being of the dual type having operating buttons 142 and 144, button 142 operating the motor in the direction to raise the vehicle engaging fixture 22 and button 144 operating the motor in the direction to lower fixture 22. The two buttons 142 and 144 are operated by shafts 146 and 148, respectively, extending upwardly through the housing 90 and above the upper end thereof, the two shafts having buttons 150 and 152 secured to the upper ends and provided with springs 154 and 156 which urge the shafts in the direction to release the switches. It is seen that the two buttons 150 and 152 are in easy reach of the operator's hand holding the upper end of the jack, so that the jack can be held in proper position with one hand and operated to raise the vehicle with one or two fingers of the same hand, thus making a one-handed operation of the jack and permitting the operator to use his other hand for adjusting the fixture 20, for steadying the vehicle or himself where the ground is sloping, rough or not firm.

The motor is preferably driven from the electrical system of the automobile and may be connected by separate plugs, one plug for the rear of the automobile being in the trunk, and the plug for the front of the automobile preferably being under the hood. While these special plugs and fixtures may be used where the jack is to be carried and used permanently with the automobile, they are not necessary, and a connection to the cigarette lighter in the car may be used, thus avoiding special installation and wiring for the operation of the jack.

Figure 3:
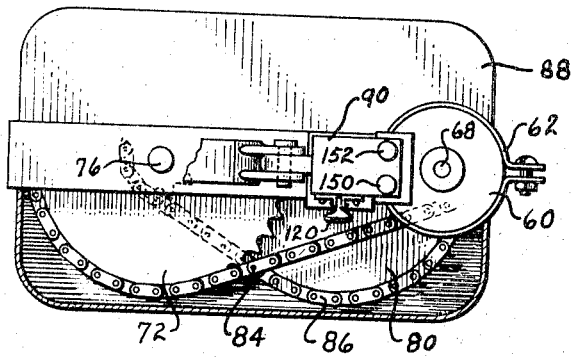
FIGURE 3 is a top plan view of the jack shown in FIGURES 1 and 2 with the cover for the drive mechanism broken away.
Figure 11:
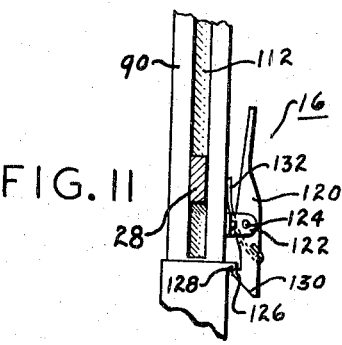
FIGURE 11 is a fragmentary partial cross sectional and elevational view of the side opposite that shown in FIGURE 2, the section being taken on line 11—11 of FIGURE 1.

In the operation of the present jack, the operator may have the jack disassembled and stored in the trunk of his automobile. When it is necessary to jack the vehicle, the two parts are removed and the base or lower part 14 is placed on the ground and upper part 12 is telescopically positioned in body 40 with the lower end of column 85 connected to shaft 82 by interlocking lug 114 of slot 116. With the housing 90 mounted in this position on the lower part 14, the lower ends of shafts 146 and 148 are positioned directly above but spaced from buttons 142 and 144, respectively. With the shaft in the lowered position, as the housing is placed in body 40, the latch locks the two parts together, as illustrated in FIGURE 11. With the fixture in its lowered position, the assembled jack is placed adjacent to the vehicle with the hook 24 of fixture 22 engaging the lower portion of the vehicle bumper. The jack is held upright by the operator and button 150 is pressed, pushing shaft 146 downwardly and causing it to engage button 142 and operate the motor and to rotate the drive mechanism and screw in the direction to move nut 110 upwardly on the screw, thus raising hook 24 into firm engagement with the bottom edge of the bumper. Further operation of the motor in this direction raises fixture 22, and along with it, the portion of the vehicle to which the fixture is connected. After the vehicle has been raised to the desired height, the operator merely releases button 150 and spring 154 lifts shaft 146 from button 142, which in turn releases the switch, and the motor stops. Inasmuch as the lift mechanism is a screw drive, no brake or latch mechanism is required to hold fixture 22 in any desired elevated position. When the vehicle is to be lowered, the operator presses button 152 which, through shaft 148, operates button 144 of the respective switch, causing the motor to rotate in the direction to lower nut 110 and fixture 22. When fixture 22 has been disengaged from the vehicle bumper, the jack is returned to the trunk of the vehicle by operating latch 16 to release part 12 from part 14, and then placing the two parts in the trunk separately.

While only one embodiment of the present invention has been described in detail herein, various changes and modifications may be made without departing from the scope of the invention.

I claim:

1. A vehicle jack comprising a base having a body with a vertically positioned tubular member mounted thereon, a vertically positioned shaft in said tubular member, a foot pivotally connected to the lower end of said body, a reversible motor mounted on said base and having a shaft, a switch having separate members for controlling the direction of operation, a speed reduction drive mechanism mounted on said base and having a small sprocket connected to the motor shaft, a rotatable hub, a relatively large sprocket mounted on said hub for rotation therewith, a chain connecting said sprockets, a relatively small sprocket mounted on said hub for rotation therewith, a relatively large sprocket connected to said vertical shaft, a chain connecting said last two mentioned sprockets, an elongated vertically positioned housing having a vertial slot and a lower end for seating in the tubular member on said base, an elongated screw journalled in said housing, a means releasably connecting said screw in driving relation with said first mentioned shaft, a nut on said screw having a lug extending through said slot, a fixture pivotally connected to said lug and having a means for engaging a part on the vehicle to be lifted, a switch operating means adjacent the upper end of said housing including a pair of shafts extending downwardly through said housing for operating said switch members, and a latch means releasably locking said housing and base together.

2. An electric vehicle jack comprising a base having a tubular body vertically positioned thereon, a shaft in axial alignment with said hole, a reversible motor mounted on said base and having a shaft, a switch having members for controlling the motor direction, a speed reduction drive mechanism mounted on said base and having a small sprocket connected to the motor shaft, a rotatable hub, a relatively large sprocket mounted on said hub for rotation therewith, a chain connecting said sprockets, a relatively small sprocket mounted on said hub for rotation therewith, a relatively large sprocket connected to said vertical shaft, a chain connecting said last two mentioned sprockets, an elongated vertically positioned housing having a vertical slot and a lower end for seating in the tubular body on said base, an elongated screw journalled in said housing, a means releasably connecting said screw in driving relation with said first mentioned shaft, a nut on said screw having a lug extending through said slot, a vehicle engaging fixture connected to said lug, and a switch operating means adjacent the upper end of said housing including a pair of shafts extending downwardly therefrom for operating said switch members.

3. An electric vehicle jack comprising a base having a vertical shaft, a reversible motor mounted on said base and having a shaft, a speed reduction drive mechanism mounted on said base and having a small sprocket connected to the motor shaft, a rotatable hub, a relatively large sprocket mounted on said hub for rotation therewith, a chain connecting said sprockets, a relatively small sprocket mounted on said hub for rotation therewith, a relatively large sprocket connected to said vertical shaft, a chain connecting said last two mentioned sprockets, a vertically extending housing having a lower end mounted on said base, an elongated vertically positioned housing received by the first mentioned housing and having a vertical slot, an elongated screw journalled in said elongated housing, a means connecting said screw in driving relation with said first mentioned shaft, a nut on said screw, and a vehicle engaging fixture connected to said nut.

4. A vehicle jack comprising a base having a body with means defining a vertically positioned hole, a vertically positioned shaft in said hole, a foot pivotally connected to the lower end of said body, a reversible motor mounted on said base and having a shaft, a switch having separate members for controlling the direction of operation, a speed reduction drive mechanism mounted on said base and being operatively connected to said first mentioned shaft, an elongated vertically positioned housing having a vertical slot and a lower end for seating the means defining the hole in said base, an elongated screw journalled in said housing, a means releasably connecting said screw in driving relation with said first mentioned shaft, a nut on said screw having a lug extending through said slot, a fixture pivotally connected to said lug and having a means for engaging a part on the vehicle to be lifted, switch operating means adjacent the upper end of said housing including a pair of shafts extending downwardly therefrom for operating said switch members, and a latch means releasably locking said housing and base together.

5. A vehicle jack comprising a base having a body with means defining a vertically positioned hole, a shaft in axial alignment with said means, a reversible motor mounted on said base and having a shaft, a speed reduction drive mechanism mounted on said base and being operatively connected to said first mentioned shaft, an elongated vertically positioned housing having a vertical slot and a lower end for seating in the means defining the hole in said body, an elongated screw journalled in said housing, a means connecting said screw in driving relation with said first mentioned shaft, a nut on said screw having a lug extending through said slot, a vehicle engaging fixture connected to said lug, and switch operating means adjacent the upper end of said housing for operating said motor.

6. A vehicle jack comprising a base having a vertical shaft, a reversible motor mounted on said base and having a shaft, a speed reduction drive mechanism mounted on said base and being operatively connected to said shafts, a housing having a lower end for seating on said base, means for slidably and releasably holding said housing in vertical position on said base, an elongated screw journalled in said housing, a means connecting said screw in driving relation with said first mentioned shaft, a nut on said screw, and a vehicle engaging fixture connected to said nut.

7. A vehicle jack comprising a base, a reversible motor mounted on said base and having a shaft, a switch having separate members for controlling the direction of operation, a speed reduction drive mechanism mounted on said base and being operatively connected to said shaft, a housing having a lower end for seating on said base, means for slidably and releasably holding said housing in vertical position on said base, an elongated screw journalled in said housing, a means releasably connecting said screw in driving relation with said first mentioned shaft, a nut on said screw, a vehicle engaging fixture connected to said nut, switch operating means adjacent the upper end of said housing including a pair of shafts extending downwardly through said housing for operating said switch members, and a latch means releasably locking said housing and base together.

8. An electric jack comprising a base, a reversible motor mounted on said base and having a shaft, a housing having a lower end for seating on said base, means for slidably and releasably holding said housing in vertical position on said base, an elongated screw journalled in said housing, a speed reduction drive mechanism mounted on said base and being operatively connected to said shaft and screw, a nut on said screw, a load engaging fixture connected to said nut, and switch operating means adjacent the upper end of said housing for operating said motor.

9. An electric jack comprising a base, a reversible motor mounted on said base, a housing having a lower end for seating on said base and being separable from said base, means for slidably and releasably holding said housing in vertical position on said base, an elongated screw journalled in said housing, a means connecting said screw in driving relation with said first mentioned motor, a nut on said screw, a load engaging fixture connected to said nut, and a latch means releasably locking said housing and base together.

References Cited by the Examiner

UNITED STATES PATENTS

| | | | |
|---|---|---|---|
| 1,324,851 | 12/1919 | Roos | 254—103 |
| 1,414,683 | 5/1922 | Anglada | 254—103 |
| 1,423,834 | 7/1922 | Crum. | |
| 1,444,969 | 2/1923 | Ham. | |
| 1,840,627 | 1/1932 | Hott | 254—103 |
| 3,083,948 | 4/1963 | Goldfader | 254—103 |
| 3,199,839 | 8/1965 | Linder et al. | 254—103 X |

OTHELL M. SIMPSON, *Primary Examiner.*